SUBSCRIPTION TELEVISION SYSTEM

Filed Jan. 29, 1954 8 Sheets-Sheet 1

WALTER S. DRUZ
NORMAN T. WATTERS
*INVENTORS.*

BY Francis W. Crotty

THEIR ATTORNEY.

SUBSCRIPTION TELEVISION SYSTEM

Filed Jan. 29, 1954 8 Sheets-Sheet 2

WALTER S. DRUZ
NORMAN T. WATTERS
*INVENTORS.*

BY Francis W. Crotty

THEIR ATTORNEY.

WALTER S. DRUZ
NORMAN T. WATTERS
*INVENTORS.*
BY
THEIR ATTORNEY.

WALTER S. DRUZ
NORMAN T. WATTERS,
*INVENTORS.*
BY Francis W. Crotty
THEIR ATTORNEY.

WALTER S. DRUZ
NORMAN T. WATTERS
*INVENTORS.*
BY Francis W. Crotty
THEIR ATTORNEY.

SUBSCRIPTION TELEVISION SYSTEM

Filed Jan. 29, 1954 8 Sheets-Sheet 6

WALTER S. DRUZ
NORMAN T. WATTERS
*INVENTORS.*

BY Francis W. Crotty

THEIR ATTORNEY.

Feb. 2, 1960 W. S. DRUZ ET AL 2,923,764

SUBSCRIPTION TELEVISION SYSTEM

Filed Jan. 29, 1954 8 Sheets-Sheet 7

WALTER S. DRUZ
NORMAN T. WATTERS
*INVENTORS.*

BY Francis W. Crotty

THEIR ATTORNEY.

SUBSCRIPTION TELEVISION SYSTEM

Filed Jan. 29, 1954 8 Sheets-Sheet 8

WALTER S. DRUZ
NORMAN T. WATTERS
*INVENTOR.*

BY Francis W. Crotty

THEIR ATTORNEY.

United States Patent Office 2,923,764 Patented Feb. 2, 1960

2,923,764

SUBSCRIPTION TELEVISION SYSTEM

Walter S. Druz, Bensenville, and Norman T. Watters, Westchester, Ill., assignors to Zenith Radio Corporation, a corporation of Delaware Application January 29, 1954, Serial No. 407,052

14 Claims. (Cl. 178—5.1)

This invention pertains to subscription television systems in which a television signal is transmitted in coded form to be utilized only in subscriber receivers equipped with decoding devices controlled in accordance with the coding schedule employed at the transmitter. Since the invention may be practiced in either a transmitter or receiver, the term "encoding" is used herein in its generic sense to encompass either coding at the transmitter or decoding at the receiver.

In copending application Serial No. 370,174, filed July 24, 1953 in the name of Walter S. Druz, and assigned to the present assignee, there is disclosed and claimed a subscription television system in which each one of a plurailty of different operating modes may be established in a periodically repeating sequence in response to a periodically recurring control signal. Each of the modes preferably introduces a distinctive time relation between the video and synchronizing components of the television signal. In establishing the operating modes line-synchronizing pulses are applied to a frequency divider, such as a conventional blocking oscillator, where they may be divided on a 5:1 basis to provide a series of periodically recurring signal components for an actuating or cycling system. This system, which has a plurality of operating conditions, is actuated from one such condition to the next in response to each signal component to effect a corresponding actuation of an encoding device, which also has a plurality of operating conditions each of which imposes an assigned operating mode on the television system. This results in mode variations in the television system every five line-trace intervals and accomplishes coding.

Further secrecy is introduced by occasionally resetting the actuating system to a reference condition to disrupt the sequential mode-changing pattern. That is, instead of permitting the actuating system to operate in its cyclic fashion for any sustained interval of time, such periodic operation is interrupted during spaced reset-time intervals, for example during field-retrace intervals, and the actuating system is selectively reset to any one of its plurality of operating conditions in accordance with a reset schedule which is made known only to subscriber receivers. Upon the termination of each reset-time interval, the actuating or cycling system commences its sequential operation anew but starts from the operating step assumed during that interval, which step is determined preferably in a random manner. In this way, a very complex coding schedule is provided since the encoding apparatus is operated in a predetermined sequence and is reset to different ones of its possible operating conditions during different and spaced reset-time intervals.

Preferably, resetting is achieved by developing during each reset-time interval a group or series of code signal components individually having a predetermined identifying characteristic such as frequency and collectively representing a predetermined code pattern in accordance with their order within each group. The code components are separated from one another for application to the actuating system to establish it in a selected operating condition at the termination of each reset-time interval as determined by each code pattern. The periodically recurring components from the aforementioned frequency divider are "gated out" or rendered ineffective during the reset-time intervals in order that no conflict may result from the simultaneous application of a component from the code group and one from the frequency divider.

The present invention is directed to an improvement of the same general type of arrangement in which even more effective coding is obtained without the necessity of providing circuitry to "gate out" or interrupt the application of the periodically recurring pulses to the actuating system. In accordance with this invention, the actuating system may be operated under the conjoint control of both the code and periodically recurring components. This has the decided advantage over the previous system of adding one more degree of secrecy to the encoding arrangement in that two, rather than one, signal sources are utilized for encoding purposes. And yet, the subject invention provides a simplification of circuitry that achieves improved coding and decoding operation with a reduction in the number of circuit components.

It is, accordingly, an object of the present invention to provide a new and improved subscription television system wherein a television signal is transmitted in coded form to be utilized only in subscriber receivers equipped with decoding devices controlled in accordance with the coding schedule employed at the transmitter.

It is another object of the invention to provide an improved and simplified encoding arrangement for a subscription television system of the general type disclosed in the above-identified Druz application.

It is still another object of the invention to provide a new and improved encoding arrangement for a subscription television system which is operated under the conjoint control of signal components from two different and separate signal sources.

In accordance with the present invention, an encoding arrangement for a subscription television system comprises encoding apparatus having a plurality of operating conditions individually establishing a predetermined operating mode in the television system. An actuating system is coupled to the encoding apparatus and this system has a corresponding plurality of operating conditions each of which is effective to establish an assigned one of the operating conditions of the encoding apparatus, the actuating system being responsive to a combination of applied signal components for assuming a selected one of its operating conditions determined by the code pattern represented by the combination of signal components. There is a first signal source for developing a first series of periodically recurring components and a second signal source for developing code signal components individually occurring at time intervals other than those in which the components of the first series occur and collectively representing a sub-combination in accordance with a predetermined schedule. Finally, the encoding arrangement includes means coupling the first and second sources to the actuating system to condition the system in accordance with the combination of signal components conjointly derived from the first and second sources.

The features of this invention which are believed to be new are set forth with particularity in the appended claims. The invention, together with further objects and advantages thereof, may best be understood, however, by reference to the following description in conjunction with the accompanying drawings, in which:

Figure 1:
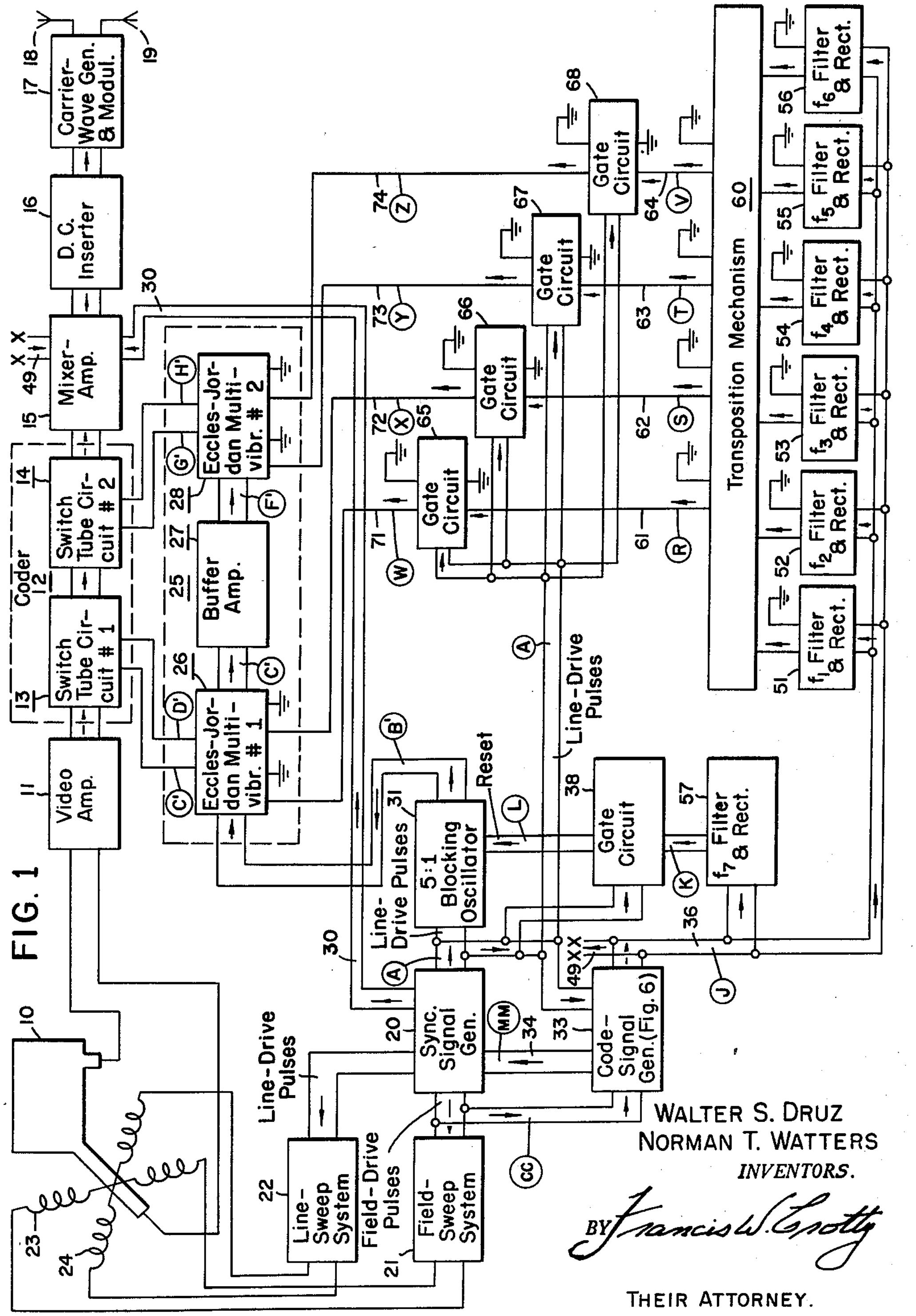
Figure 1 is a schematic representation of a subscription television transmitter constructed in accordance with the invention.
Figure 3:
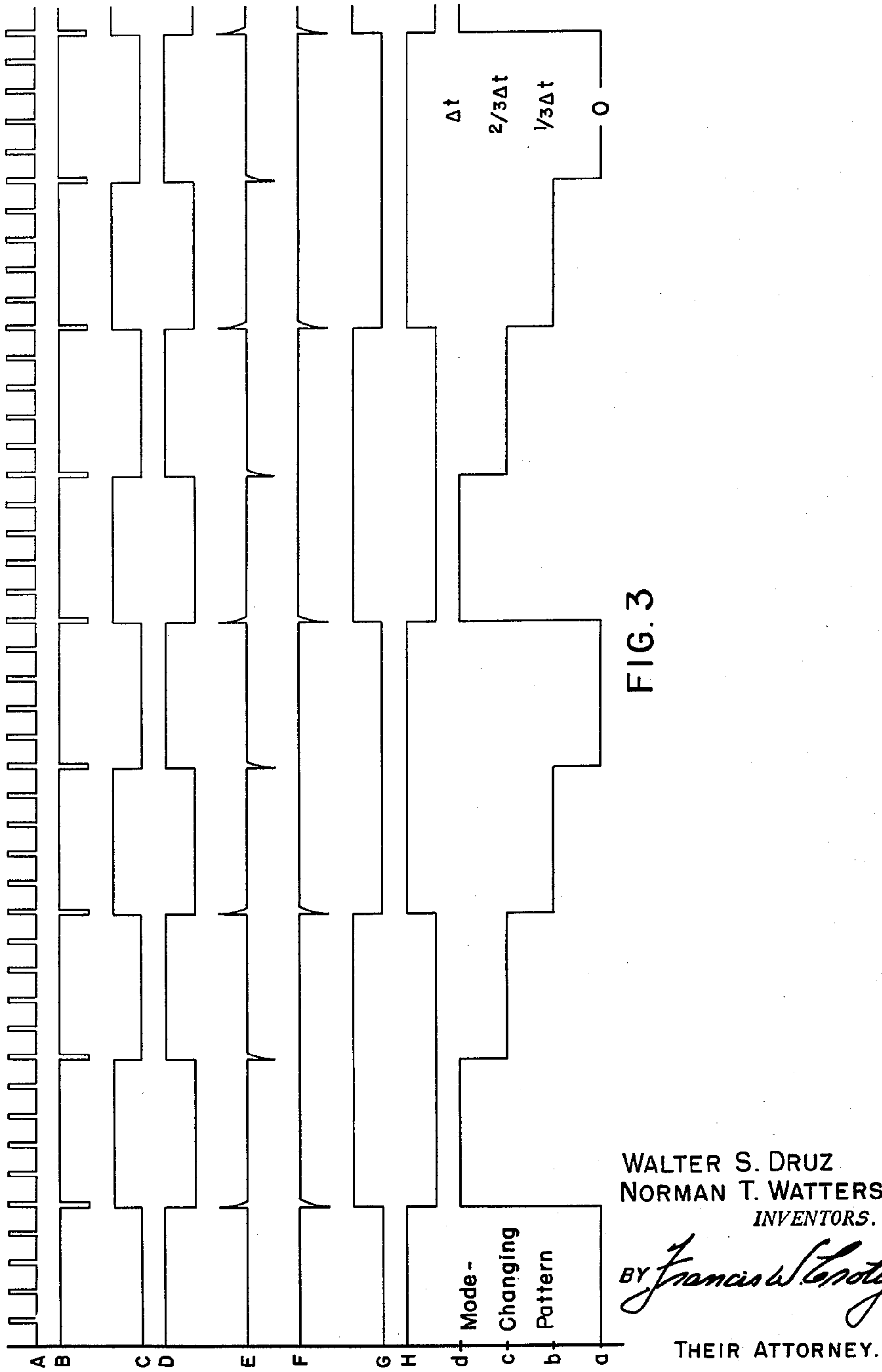
Figure 4:
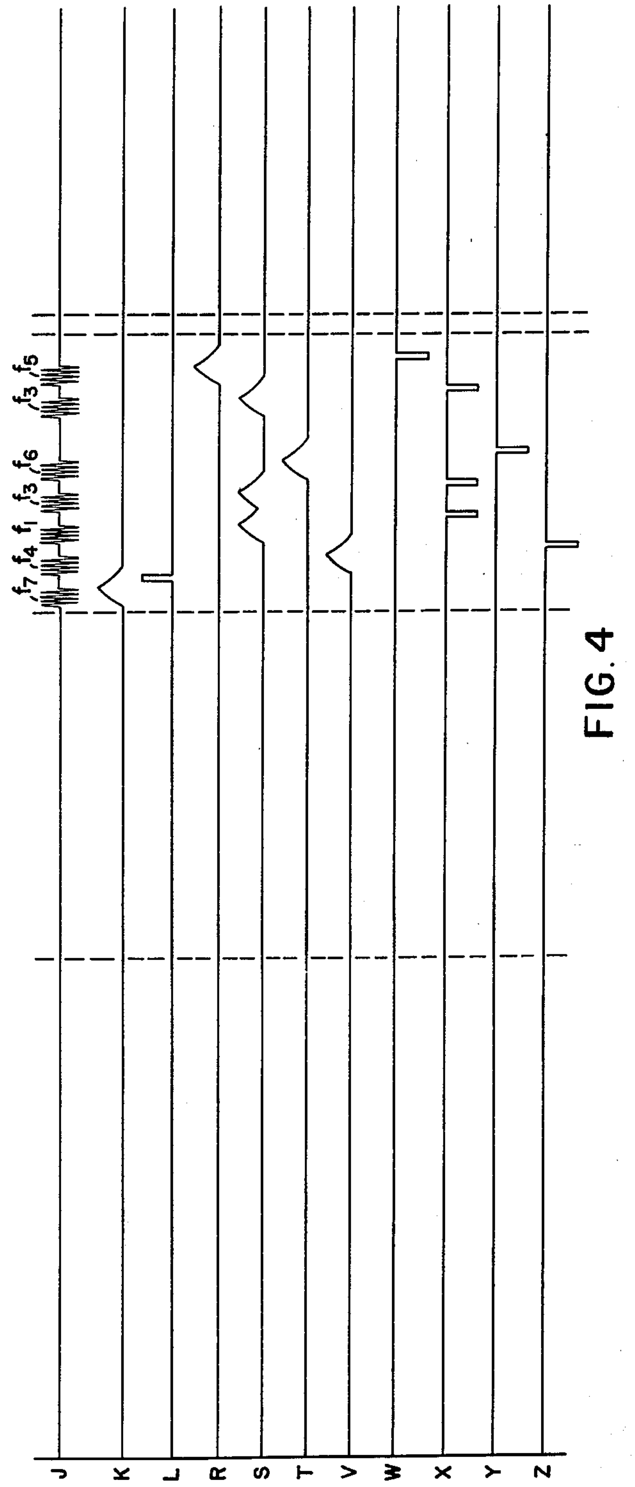
Figure 5:
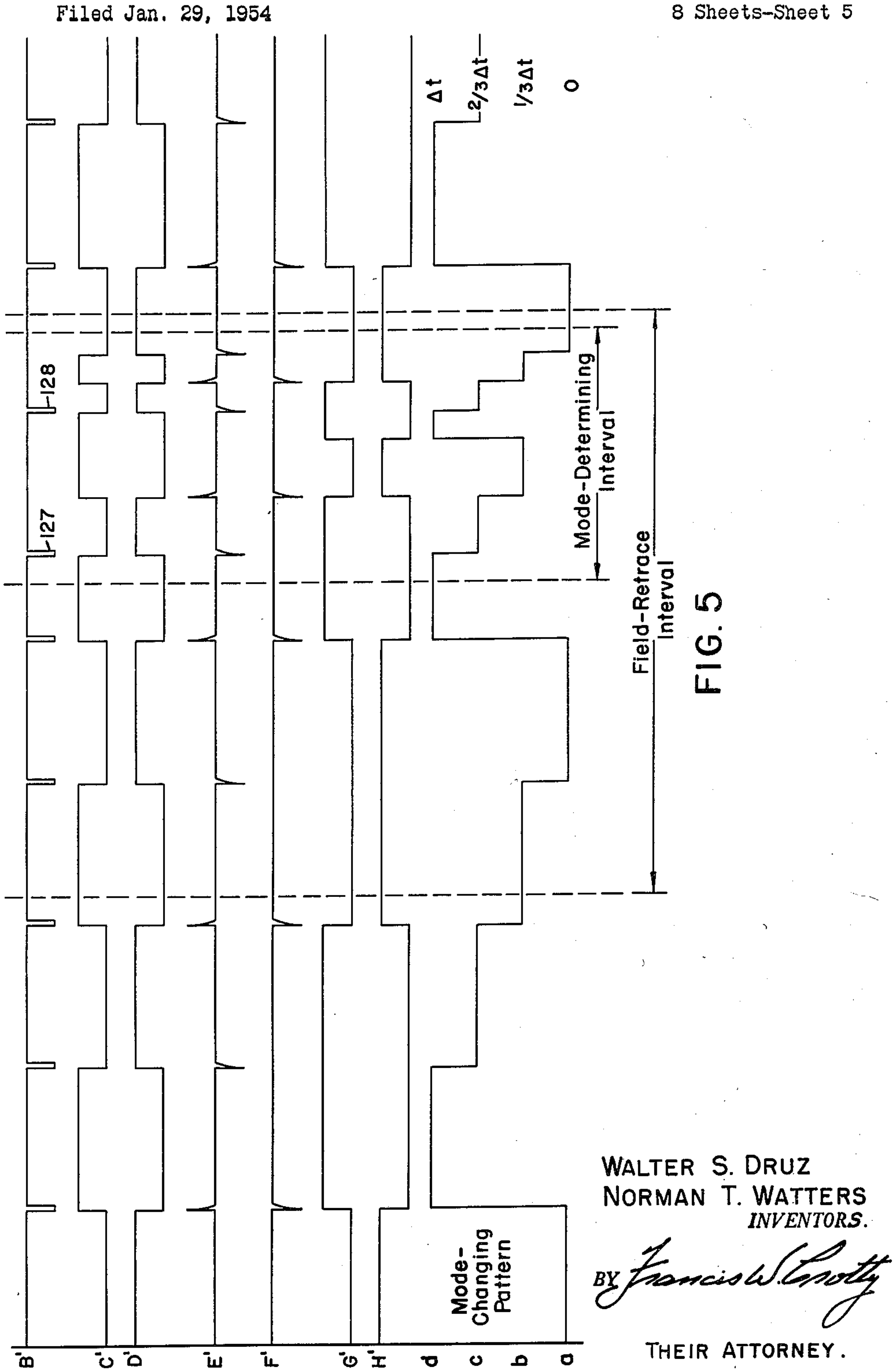
Figure 6:
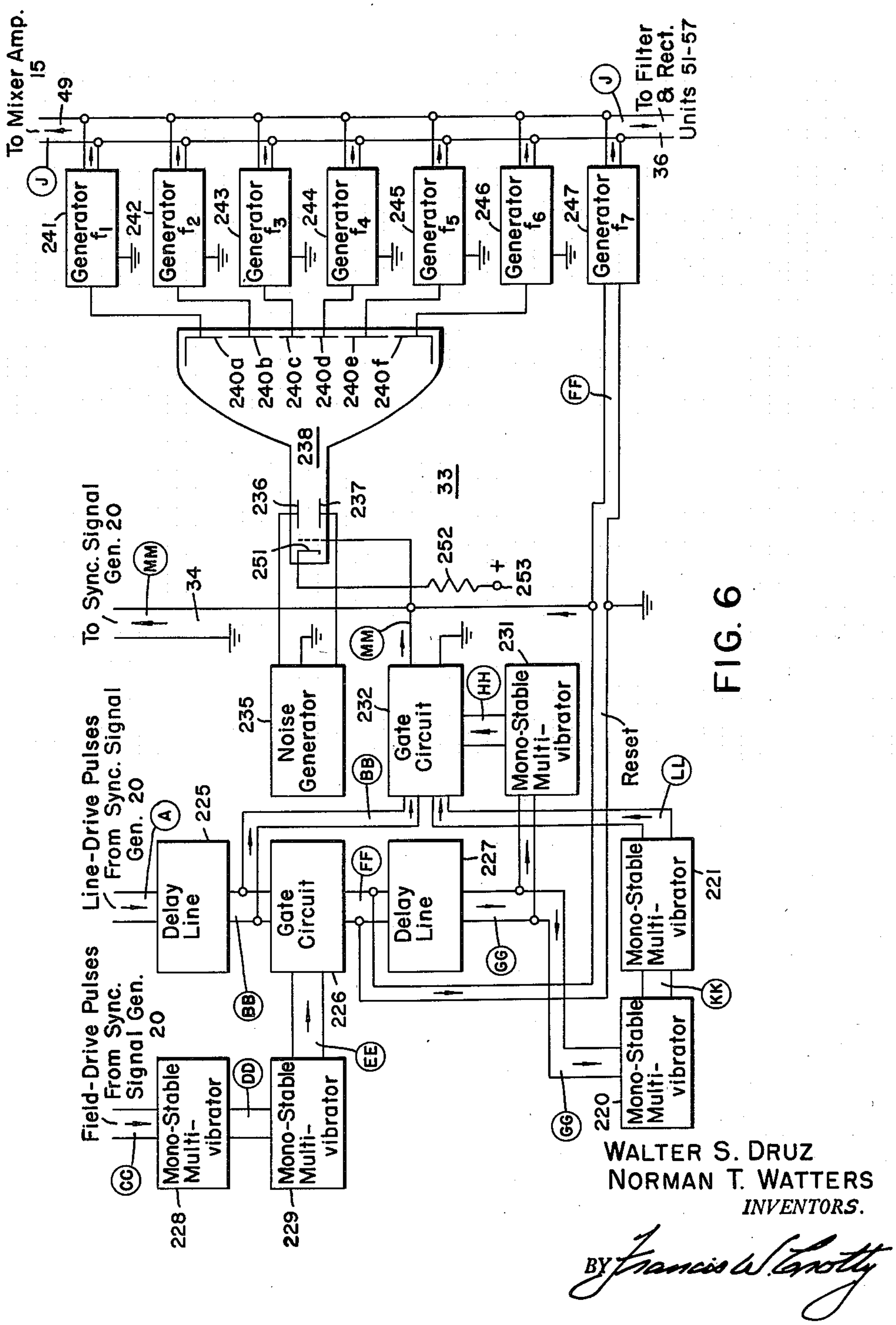
Figure 7:
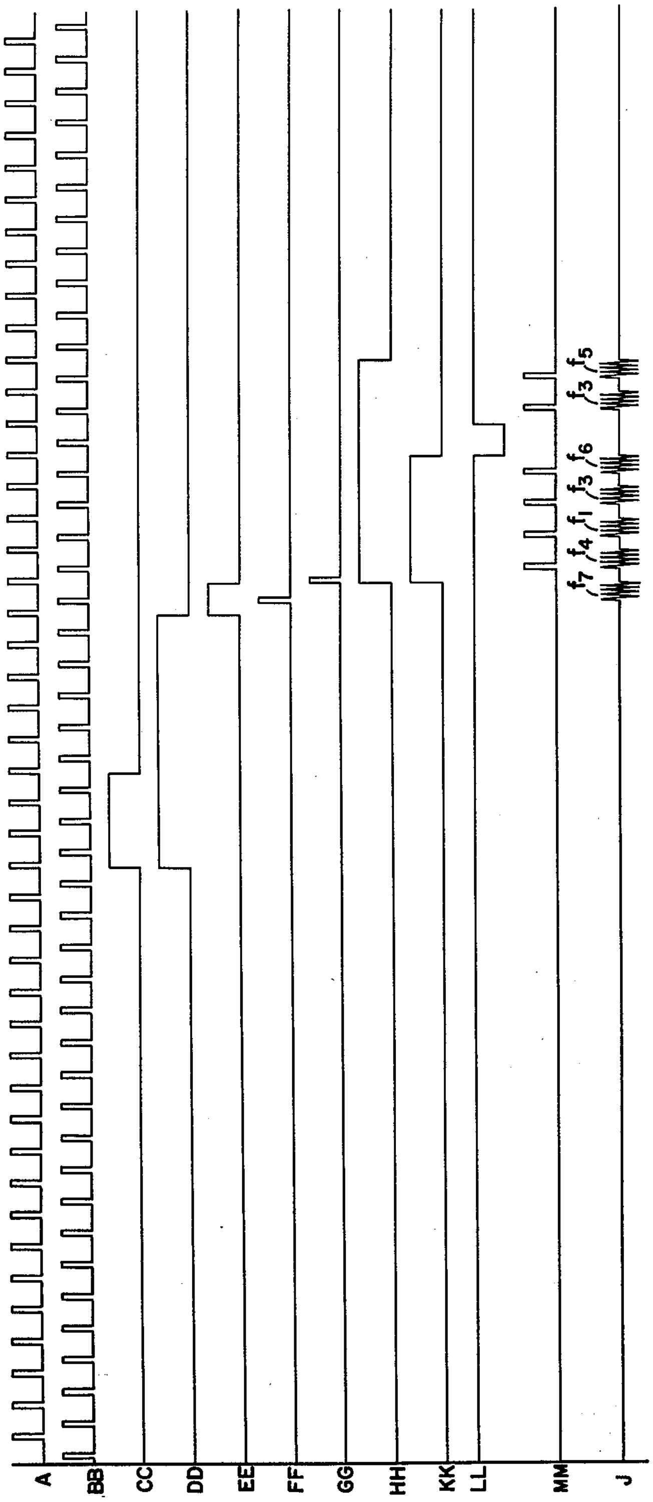
Figure 8:
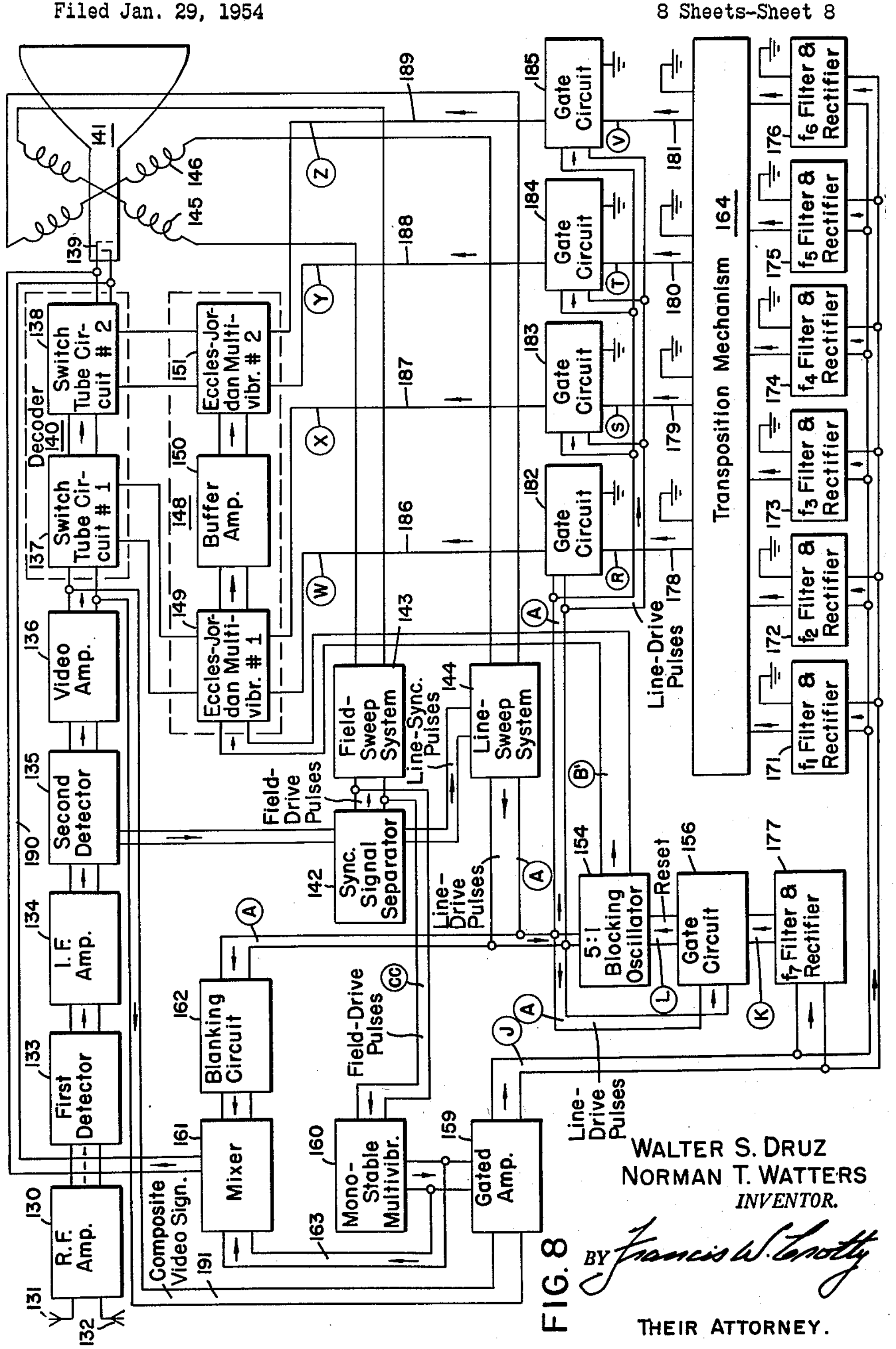

Figures 3, 4 and 5 taken together, with Figure 4 placed immediately below Figure 3 and Figure 5 placed below Figure 4, are a family of signal waveforms plus two mode-changing patterns related to those waveforms and are useful in explaining the operation of the system;

Figure 6 is a detailed representation of another portion of the transmitter illustrated in Figure 1;

Figure 7 is a group of curves used in explaining the operation of the circuit of Figure 6; and Figure 8 is a schematic representation of a subscription television receiver constructed in accordance with the invention for operation in conjunction with the transmitter of Figure 1.

The transmitter of Figure 1 includes a picture-converting device 10 which may be an iconoscope, image orthicon or other known device for deriving a video signal representing the image to be televised. The output terminals of device 10 are connected to a video amplifier 11 which, in turn, is connected to the input circuit of a switch tube circuit 13 constituting one portion of an encoding device or coder 12. The output terminals of switch tube circuit 13 are connected to the input terminals of a switch tube circuit 14 which constitutes the other portion of the encoding apparatus. The construction of this encoding device is to be described in detail hereinafter; it is sufficient to state at this time that coder 12 functions to selectively introduce various delay lines into the video channel to establish any one of four different time relationships between the video and synchronizing components of the composite video signal, thereby to establish four correspondingly different operating modes in the television transmitter. Such intermittent variations in the relative timing of the video and synchronizing components effectively codes the television signal since conventional television receivers, not equipped with appropriate decoding apparatus, depend upon an invariant time relation of the video and synchronizing components of a received signal to reproduce the image intelligence represented thereby. The output circuit of coder 12, which is specifically the output circuit of switch tube circuit 14, is connected to a mixer-amplifier 15 which, in turn, is connected through a direct-current inserter 16 to a carrier-wave generator and modulator 17. The output terminals of unit 17 are connected to an antenna 18, 19.

The transmitter also includes a synchronizing-signal generator 20 which supplies line- and field-synchronizing components and associated pedestal components to mixer-amplifier 15 over conductors 30. Generator 20 further supplies field- and line-drive pulses to a field-sweep system 21 and to a line-sweep system 22, respectively. The output terminals of sweep systems 21 and 22 are respectively connected to field-deflection elements 23 and line-deflection elements 24 associated with picture-converting device 10.

Synchronizing-signal generator 20 additionally supplies line-drive pulses to a frequency divider or conventional 5:1 blocking oscillator 31 which has its output terminals connected to the input terminals of a conventional Eccles-Jordan multivibrator 26, which constitutes one portion of an actuating or control system 25, such that the multivibrator is triggered from one to the other of its two stable operating conditions in response to successive applied pulses. Multivibrator 26 is coupled through a buffer amplifier 27 to the input terminals of another Eccles-Jordan multivibrator 28, units 27 and 28 constituting the remaining portion of actuating system 25. The two multivibrators of the actuating system have their output terminals connected to switch tube circuits 13 and 14 of encoding apparatus 12 and, as explained in detail hereinafter in connection with Figure 2, this actuating system operates in response to applied periodically recurring signal components from blocking oscillator 31 to effect actuation of the encoding apparatus between its operating conditions to encode the television signal in accordance with a predetermined code schedule.

Generator 20 also supplies field-drive pulses to one input circuit of a code signal generator 33 and line-drive pulses to another input circuit of the generator. Unit 33, which has a pair of output terminals connected to synchronizing-signal generator 20 over conductors 34, is provided to develop during each of a series of spaced reset-time intervals or mode determining intervals, for example during each field-retrace period, a group or sub-combination of code signal components each having a predetermined identifying characteristic such as frequency and collectively determining a code schedule in accordance with their sequence or order within the group. Such a generator is shown in detail in Figure 6 and is hereinafter described fully in connection therewith; it is sufficient to state at this time that in accordance with the invention the code signal components of each sub-combination developed by generator 33 individually occur at time intervals other than those in which the periodically recurring components from blocking oscillator 31 occur. As explained more fully hereinafter, the sub-combination of code components generated by generator 33 during each mode-determining interval may comprise a series of six signal bursts, each of which may be of any one of six various signal frequencies $f_1$—$f_6$ inclusive, plus a seventh burst of a predetermined fixed frequency $f_7$ which appears at the beginning of the sub-combination for resetting blocking oscillator 31, and all of these bursts are individually produced between successive line-drive pulses superimposed on a vertical blanking pulse. Preferably, the six burst frequencies appear in random sequence within each mode-determining interval, and any given burst frequency may recur twice or more in any mode-determining interval. Moreover, the seven bursts are so grouped or distributed in point of time that there is a "gap" or time interval between the fifth and sixth bursts in order that a code component does not occur in time coincidence with a periodically recurring component from blocking oscillator 31.

The code components generated in unit 33 are translated over conductors 49 to a pair of input terminals of mixer-amplifier 15 through terminals designated X—X, and over conductors 36 to the input circuits of a series of filter and rectifier units 51—57, each of which is selective to one of the different signal burst frequencies $f_1$—$f_7$ to facilitate their separation one from the other. The output terminals of filter 57 are connected to one pair of input terminals of a normally-closed gate circuit 38, this circuit having another pair of input terminals connected to synchronizing-signal generator 20 to receive line-drive pulses therefrom. The output terminals of gate circuit 38 are connected to another pair of input terminals of 5:1 blocking oscillator 31 for reset purposes. The code components which are separated in filters 51—56 are selectively applied to a series of input circuits of a transposition mechanism 60. This mechanism, which is adjusted in accordancce with a predetermined switch setting pattern, is provided merely for the purpose of selectively connecting any one of the six filter and rectifier units 51—56 to any one of four output circuits or conductors 61—64 and may comprise a family of toggle switches as shown in copending application Serial No. 326,107, filed December 15, 1952 in the name of Jack E. Bridges, and issued February 11, 1958 as Patent No. 2,823,252, and assigned to the present assignee, or a wafer switch arrangement as disclosed in copending application Serial No. 338,033, filed February 20, 1953 in the name of George V. Morris, now abandoned in favor of continuation-in-part application Serial No. 407,192, filed February 1, 1954, and issued December 30, 1958 as Patent No. 2,866,961, also assigned to the present assignee.

Conductors 61—64 are connected respectively to a series of normally-closed gate circuits 65—68, these gate circuits also individually having a pair of input terminals connected to synchronizing-signal generator 20 to derive line-drive pulses therefrom. The output circuits of gates 65 and 66 are connected over conductors 71 and 72 respectively to Eccles-Jordan multivibrator 26, and the output circuits of gates 67 and 68 are connected over conductors 73 and 74 respectively to Eccles-Jordan multivibrator 28.

Thus, blocking oscillator 31 constitutes a first signal source for developing a first series of periodically recurring signal components, and code signal generator 33 constitutes a second signal source for developing code signal components individually occurring at time intervals other than those in which the components of the first series occur and collectively representing a sub-combination in accordance with a predetermined code schedule. Moreover, the conductors from blocking oscillator 31 to Eccles-Jordan multivibrator 26, filter and rectifier units 51—57, transposition mechanism 60, conductors 61—64, gate circuits 65—68 and conductors 71—74 constitutes means coupling the first and second sources to actuating system 25 to condition the system in accordance with the combination of signal components conjointly derived from the first source 31 and from second source 33.

Figure 2:
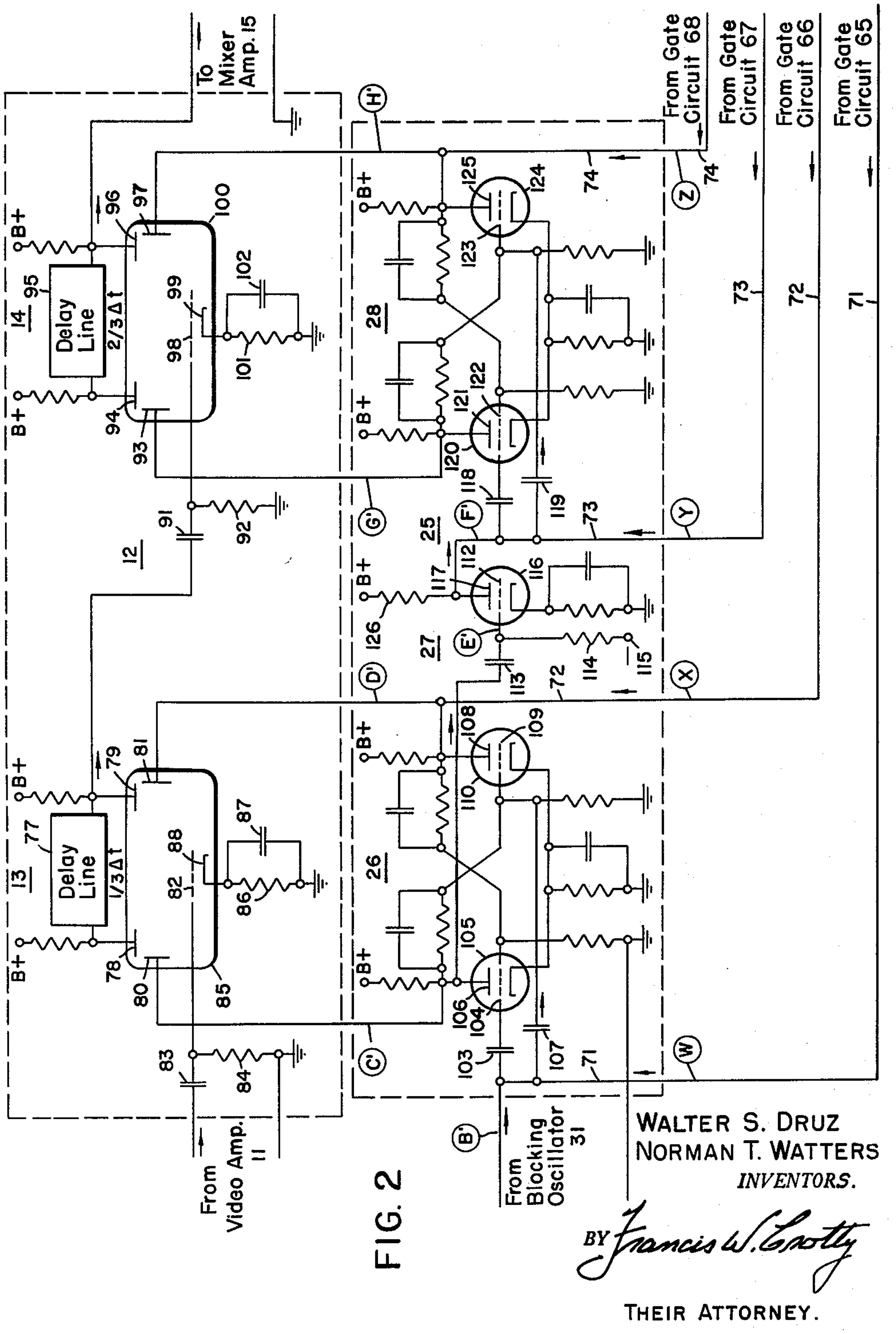
Figure 2 is a detailed schematic representation of a portion of the transmitter illustrated in Figure 1.

Reference is now made to the construction of encoding apparatus 12 and actuating system 25 and particularly to Figure 2 wherein these circuits are shown in detail. Coder 12 includes a pair of beam-deflection tubes 85 and 100 connected between video amplifier 11 and mixer-amplifier 15. Beam tubes 85 and 100 each comprise a cathode, an intensity-control grid, a pair of deflection-control electrodes, and a pair of output anodes or target electrodes and may be constructed, for example, in the manner shown and described in the copending application of Robert Adler, Serial No. 243,039, filed August 22, 1951, and issued August 7, 1956, as Patent No. 2,758,153, and assigned to the present assignee. One of the output terminals of video amplifier 11 is connected through a coupling condenser 83 to the intensity-control electrode 82 of beam tube 85, the control electrode being connected to ground through a grid-leak resistor 84 and the other output terminal of the video amplifier being connected directly to ground. The cathode 88 of tube 85 is connected to ground through a cathode resistor 86 which is shunted by a condenser 87. One of the target electrodes 78 of tube 85 is coupled to the input terminal of a non-reflecting delay line 77 and through a load resistor to the positive terminal of a source of unidirectional potential B+ while the other target electrode 79 is coupled to the output terminal of delay line 77 and through a separate load resistor to B+. Delay line 77 is so constructed that it imparts a time delay of $\frac{1}{3}\Delta t$ to a signal impressed on its input terminals, where $\Delta t$ may be considered the maximum time delay introduced into the video channel at any one time.

Target electrode 79 and the output terminal of delay line 77 are coupled to the intensity-control electrode 98 of beam tube 100 by means of a condenser 91, the control electrode being connected to ground through a grid-leak resistor 92. The cathode 99 of tube 100 is connected to ground through a cathode resistor 101 which is shunted by a by-pass condenser 102. One of the target electrodes 94 of tube 100 is coupled to the input circuit of a non-reflecting delay line 95 and through a load resistor to the positive terminal of a source of unidirectional potential B+, while the other target electrode 96 is coupled to the output terminal of delay line 95 and through a separate load resistor B+, and also to the input circuit of mixer-amplifier 15. Delay line 95 is constructed to introduce a time delay of duration $\frac{2}{3}\Delta t$ to a signal impressed on its input terminals.

The operation of encoding apparatus 12 may now be considered without regard for the additional circuitry included in the transmitter. The video signal developed at the output terminals of amplifier 11 is applied to control electrode 82 of beam tube 85 and intensity-modulates the electron beam developed therein. The video-modulated electron beam is directed either to target electrode 78 or to target electrode 79 under the control of deflection elements 80, 81 which may receive a deflection signal in a manner to be described. During intervals when the beam is directed to target 78, the videa signal is impressed on control electrode 98 of beam tube 100 through a path including delay line 77 and is delayed a selected amount (namely $\frac{1}{3}\Delta t$) due to the inclusion of the delay line in the circuit. However, when the beam is directed to target electrode 79, the video signal is applied directly to control electrode 98 with no appreciable delay. Likewise, the electron beam of tube 100, video-modulated by the signal thus applied to its control electrode 98, is directed to target electrode 94 or to target electrode 96 under the control of deflection elements 93 and 97 which may receive a deflection signal in a manner to be described. When the electron beam is directed to target 94, the video signal is applied to mixer-amplifier 15 over a path which includes delay line 95 and is delayed a selected amount (namely $\frac{2}{3}\Delta t$) due to the delay line, but when the electron beam is directed to target electrode 96, delay line 95 is removed from the video channel and no appreciable delay is imparted to the video signal in its translation through beam tube 100 to mixer-amplifier 15.

In any interval in which the electron beams in tubes 85 and 100 are directed respectively to targets 79 and 96, the video signal from amplifier 11 is supplied to mixer-amplifier 15 with no appreciable time delay relative to the synchronizing components supplied to the mixer from generator 20, and the transmitter may be considered as operating in a normal mode designated mode "*a*." When the electron beam in tube 85 is directed to target 78 and the beam in tube 100 is directed to target 96, delay line 77 is introduced into the video channel, and the video signal is delayed a predetermined amount (namely $\frac{1}{3}\Delta t$) relative to the synchronizing components; in such an operating condition, the transmitter may be said to be operating in mode "*b*." When the beam in tube 85 is directed to target 79 and the beam in tube 100 is directed to target electrode 94, only delay line 95 is effective; the delay introduced by line 95 amounts to $\frac{2}{3}\Delta t$ and the transmitter may be considered as operating in mode "*c*." Finally, when the beam in tube 85 is directed to target electrode 78 and the beam in tube 100 is directed to target electrode 94, both delay lines 77 and 95 are effective and the delay of the video signal is determined by the total delay of the two lines, that is $\frac{1}{3}\Delta t+\frac{2}{3}\Delta t$, or $\Delta t$, to establish mode "*d*" operation. Therefore, by selective application of deflection signals to deflection elements 80, 81 and 93, 97, the operation of the transmitter may be switched between four modes, and variation of these deflection signals from time to time provides a highly complex coding schedule for the transmitted television signal.

The deflection of the electron beams in tubes 85 and 100 is controlled by conventional Eccles-Jordan multivibrators 26 and 28 of actuating system 25. To this end, deflection electrode 80 is connected to the anode 106 of one electron-discharge device 105 of Eccles-Jordan multivibrator 26, while deflection electrode 81 is connected to the anode 108 of the other electron-discharge device 110 of multivibrator 26. Similarly, deflection element 93 is connected to the anode 121 of one electron-discharge device 120 of Eccles-Jordan multivibrator 28, while deflection electrode 97 is connected to the anode 125 of the other electron-discharge device 124 of multivibrator 28.

Actuating system 25 is actuated through its sequence of operating steps by means of the periodically recurring signal components which are applied from blocking oscillator 31 through a condenser 103 to the control electrode 104 of discharge device 105 and through a condenser 107 to the control electrode 109 of discharge device 110. The control electrode 112 of buffer amplifier tube 116 is connected to anode 106 through a condenser 113, control electrode 112 also being connected to a source of negative bias potential 115 through a resistor 114 which in combination with condenser 113 forms a differentiating circuit. The anode 117 of discharge device 116 is connected to B+ through a load resistor 126 and through condensers 118 and 119 to the control electrodes 122 and 123 of discharge devices 120 and 124 respectively. Output conductor 71 from gate circuit 65 is connected to control electrodes 104 and 109 through condensers 103 and 107 respectively, output conductor 72 from gate circuit 66 is connected to anode 108, output conductor 73 from gate circuit 67 is connected to control electrodes 122 and 123 through condensers 118 and 119 respectively, and output conductor 74 from gate circuit 68 is connected to anode 125.

The operation of the described transmitter will first be considered without regard to the technique of coding. Picture-converting device 10 produces video-frequency components representing the picture information to be televised and these components, after amplification in video amplifier 11, are supplied through coder 12 to mixer amplifier 15. The mixer also receives the usual line- and field-synchronizing and blanking pulses over conductors 30 from generator 20 so that a composite video signal is developed therein. That signal is adjusted as to proper background level in direct-current inserter 16 and is amplitude modulated on the picture carrier in unit 17 to develop a composite television signal. The modulated video carrier is supplied to antenna 18, 19 for transmission to subscriber receivers. It will, of course, be understood that in the generation of the video-frequency components, sweep systems 21 and 22 are synchronized by the field- and line-drive pulses from generator 20. As in any television broadcast, the accompanying audio information is modulated on a sound carrier and concurrently radiated; however, the sound system may be entirely conventional and since it constitutes no part of the present invention, further description is omitted in order to avoid unnecessarily encumbering the drawing.

Briefly, coding of the video portion of the broadcast is accomplished by coder 12 under the influence of the deflection-control signals developed by actuating system 25 which switch the beams of tubes 85 and 100 back and forth between their respective target electrodes. As previously explained, this actuation of the encoding apparatus varies the operating mode of the transmitter by modifying the time relation of the video and synchronizing components of the radiated signal and thus achieves very effective coding.

In order to simplify the detailed explanation of the operation of the invention, idealized signal waveforms appearing at various portions of the transmitter indicated by encircled reference letters are given corresponding letter designations in the graphical representations of Figures 3–5. Consideration will now be given to the cyclic actuation of coder 12 without regard to the effect of the code signal components, by reference to the schematic diagrams of Figures 1 and 2 and the wave forms of Figure 3, disregarding the priming of the letter designations on the circuit diagrams. Positive-polarity line-drive pulses (waveform A) from generator 20 are applied to blocking oscillator 31 wherein they are effectively frequency-divided on a 5:1 basis so that a pulse of negative polarity is developed at the output terminals of unit 31 for every five line-drive pulse applied thereto. The output signal from blocking oscillator 31 is shown in curve B and is, in turn, applied to control electrodes 104 and 109 of multivibrator 26 of actuating system 25. For convenience, bi-stable multivibrator 26 is assumed to be initially in its first stable operating condition wherein discharge device 105 is conductive and device 110 is nonconductive, as indicated by the initial portions of waveforms C and D which appear respectivey at anodes 106 and 108, although the initial operating condition is immaterial since each pulse of waveform B is applied to the control electrodes of both tubes 105 and 110 and thus is effective to cut off the conducting tube whichever one that may be. On application of the first pulse of waveform B, discharge device 105 is therefore made nonconductive, and by means of well-known multivibrator action device 110 becomes conductive. Similarly, in response to the second pulse of curve B, multivibrator 26 is again triggered inasmuch as the negative pulse is applied to control electrode 109 to cause device 110 to become nonconductive and device 105 conductive. Thus, by virtue of the fact that the negative pulses of curve B are always applied to the control electrodes of both tubes of multivibrator 26, this circuit is triggered between its operating conditions by successive B pulses, as shown by curves C and D.

The signal developed at anode 106, namely curve C, is also applied to the differentiating circuit 113, 114 to produce the signal of curve E. This latter signal is impressed on control electrode 112 of buffer amplifier device 116 which is normally biased beyond cut-off by means of the negative potential impressed on control electrode 112 from source 115; thus only the positive-polarity differentiated pulses of curve E are translated through the buffer stage where they undergo a normal 180° phase inversion. The signal of curve F therefore appears at anode 117 of device 116 and is impressed on control electrodes 122 and 123 of multivibrator 28 via condensers 118 and 119 respectively to trigger multivibrator 28 between its two operating conditions in the same manner as explained with respect to multivibrator 26; since the pulses of wave form F correspond to alternate B pulses, the frequency of operation of multivibrator 28 is one-half that of multivibrator 26. The waveforms of curves G and H represent the signals appearing respectively at anodes 121 and 125.

From an analysis of the family of curves in Figure 3, it is apparent that the signals of curves C and D, which are applied to deflection elements 80 and 81 respectively to control the positioning of the electron beam of tube 85, as well as the signals of curves G and H, which are applied to deflection elements 93 and 97 respectively of tube 100, are in respective counterphase and thus provide balanced operation of the beam tube deflection elements. It is further to be noted from examining the extreme left-hand portions of the curves, that under the assumed initial operating conditions, the potential of deflection element 81 is positive with respect to the potential impressed on deflection electrode 80, and the potential of deflection electrode 97 is positive with respect to the potential appearing on deflection element 93. Thus, before the application of the first pulse of curve B, the electron beam of tube 85 is directed to target electrode 79 and the beam of tube 100 is connected by target element 96. The video signal is therefore channelled at this time from video amplifier 11 directly to mixer-amplifier 15 and consequently the transmitter is established in mode "*a*," the mode in which there is no appreciable time delay between the video and synchronizing components.

A mode-changing diagram has been shown at the bottom of Figure 3 to further illustrate the effect of the cycling feature of the encoding apparatus in producing mode changes at a faster-than-field rate (i.e. at intervals occurring more frequently than the field-scanning intervals) and in a regular repeating fashion.

In response to the first pulse of curve B, the relative potentials at deflection elements 80 and 81 are reversed due to the actuation of multivibrator 26 and the beam of tube 85 is thereby switched over to target electrode 78. Additionally, the beam of tube 100 is now directed to target 94 because of the reversal of the relative potentials of deflection elements 93 and 97 effected by the triggering of multivibrator 28. Both delay lines 77 and 95 are now interposed in the video channel so that the maximum time delay $\Delta t$ is introduced between the video and synchronizing components to establish the system in mode "*d*" operation, as illustrated in the mode-changing pattern.

When the second input pulse of waveform B is applied to the actuating system, multivibrator 26 assumes its opposite condition, thus switching the beam of device 85 to target electrode 79 and effectively removing delay line 77 from the video circuit. However, multivibrator 28 is not triggered at this time; thus a time delay of $\frac{2}{3}\Delta t$, as contributed by delay line 95, is still functionally included in the video channel to establish the system in mode "*c*" operation, as represented by the corresponding interval in the mode-changing pattern. In response to the third pulse of curve B, both multivibrators are actuated so that delay line 95 is effectively removed and delay line 77 is inserted into the video channel, thus introducing a time delay of $\frac{1}{3}\Delta t$ for mode "*b*" operation. Finally, in response to the fourth input pulse to system 25, multivibrator 26 operates to effectively remove delay line 77 from the video circuit to complete the cycle and bring the television system back to mode "*a*" operation, as illustrated in the mode-changing pattern of Figure 3. Actuating system 25 operates continuously as described to effect cyclic mode changes in the television system between four operating modes at a faster-than-field rate.

Consideration will now be given to the particular manner in which the actuating system is conditioned during retrace intervals under the conjoint control of the code components from generator 33 as well as the periodically recurring components from blocking oscillator 31 in accordance with the present invention, particular reference being made to Figure 1 and the curves of Figures 4 and 5. In order to maintain the correct time relationship between all of the various curves illustrated, Figure 4 should be placed immediately below Figure 3, and Figure 5 should be placed below Figure 4.

During any one particular field-retrace interval, code signal generator 33 may develop a series or subcombination of code signal components including an initial reset burst $f_7$, as shown in curve J of Figure 4. As mentioned hereinbefore and in accordance with the invention, there is a relatively long time interval or "gap" between the fifth and sixth bursts of the sub-combination of code components produced in generator 33 to insure that no code components occur in time coincidence with the pulses from blocking oscillator 31. This specific timing of the various bursts from generator 33 is illustrated in curve J, and the manner in which such timing or grouping is accomplished will be fully described hereinafter.

The code signal components of curve J are applied to filter and rectifier units 51—57, and the first burst ($f_7$) only is accepted and rectified in filter 57 to produce the pulse of curve K. This signal is applied to normally-closed gate circuit 38, which is also supplied with the line-drive pulses of waveform A (Figure 3), to "gate in" the line-drive pulses of curve A occurring in time coincidence therewith. The pulse so gated in is shown in curve L and is utilized to trigger 5:1 blocking oscillator 31. The effect of this pulse on the blocking oscillator is to be made apparent hereinafter.

The remaining code bursts from the sub-combination of curve J, that is the bursts having frequencies $f_1$—$f_6$, are separated from one another and rectified in rectifier circuits 51—56 for individual application to the various input circuits of transposition mechanism 60.

The transposition mechanism establishes prescribed circuit connections between its input circuits and output conductors 61—64 so that the rectified components are supplied to normally-closed gate circuits 65—68 in accordance with a code schedule. For purposes of illustration, it may be assumed that mechanism 60 is so adjusted that $f_5$ filter and rectifier unit 55 is connected to conductor 61 to supply the rectified $f_5$ burst of curve R to gate circuit 65, that $f_1$ filter and rectifier unit 51 and $f_3$ filter and rectifier unit 53 are both connected via transposition mechanism 60 to conductor 62 to supply the rectified $f_1$ and $f_3$ bursts as shown in curve S to gate circuit 66, that $f_6$ filter and rectifier unit 56 is connected through the transposer to conductor 63 to apply the rectified $f_6$ burst of curve T to gate circuit 67, and finally, that $f_4$ filter and rectifier unit 54 is connected by means of transposition mechanism 60 to conductor 64 to impress the rectified $f_4$ burst of curve V on gate circuit 68. Filter and rectifier unit 52 may also, of course, be connected to any selected one of output conductors 61—64 through the transposition mechanism but inasmuch as no $f_2$ burst occurs in the assumed code signal sub-combination, this rectifier unit is momentarily ineffective.

Normally-closed gate circuits 65—68 also receive line-drive pulses (waveform A of Figure 3) from generator 20, and the signals of curves R, S, T and V "gate in" the line-drive pulses of curve A that occur in time coincidence with each individual gating pulse, so that the signals of curves W and X are supplied over conductors 71 and 72 respectively to Eccles-Jordan multivibrator 26 and the signals of curves Y and Z are translated over conductors 73 and 74 respectively to Eccles-Jordan multivibrator 28.

In Figure 5, curves B′, C′, D′, E′, F′, G′, and H′ illustrate the modifying effect of the code signal components on the periodic operation exemplified by the waveforms of curves B, C, D, E, F, G and H respectively, and a modified mode-changing pattern is also included to exemplify the effect of the code signal components on the code schedule. For convenience it may be assumed that the cyclic operation of the encoding apparatus during the first field-trace interval under consideration is precisely as described in connection with the wave forms and mode-changing pattern of Figure 3. However, the first signal burst occurring during a field-retrace interval (the $f_7$ reset burst of curve J) causes a pulse (curve L) to be applied to blocking oscillator 31; this results in premature actuation of the blocking oscillator and momentarily disrupts its 5:1 count, as indicated by pulse 127 of wave form B′. Multivibrator 26 is therefore actuated prematurely (i.e. at the start of the mode-determining or reset-time interval instead of two counts later as in the case of cyclic operation discussed in connection with Figure 3) to establish the television system in mode "*c*" operation, as shown in the mode-changing pattern of Figure 5. Blocking oscillator 31 then resumes its normal 5:1 count.

In response to the next burst of curve J, namely the $f_4$ burst, the pulse of curve Z is applied to control electrode 122 of device 120 (Figure 2) over the cross-coupling circuit from anode 125, and since that device is already in its non-conductive state (as shown by curve G′) the applied negative pulse is not effective. Consequently, no mode change is accomplished. However, when the next burst of curve J is received in the system, that is the $f_1$ burst, the first pulse of curve X is impressed on control electrode 104 of device 105 over the cross-coupling network from anode 108, and finding device 105 in a conductive state, is effective to cut off the device. Multivibrator 26 therefore changes operating conditions and, in turn, causes multivibrator 28 to assume its opposite condition. The beams of tubes 85 and 100 are switched over to targets 78 and 96 respectively and thus the television system is established in mode "*b*."

When the succeeding burst of curve J occurs, that is the $f_3$ burst, the second pulse of curve X is applied to control electrode 104 of tube 105, but since that tube is already non-conductive the pulse has no effect. The next occurring burst in the sub-combination ($f_6$) causes translation of the pulse of curve Y to control electrodes 122 and 123 of devices 120 and 124, respectively. Multivibrator 28 is thus actuated to its opposite condition as shown by curves G' and H', and the beam of tube 100 is switched to target electrode 94, thereby establishing the system in mode "*d*."

One line-trace interval subsequent to the translation of the $f_6$ burst, blocking oscillator 31 produces pulse 128 resulting from its normal 5:1 counting cycle and this pulse effects actuation of multivibrator 26 to its opposite condition. Delay line 77 is thus effectively removed from the video channel and the system assumes mode "*c*" operation. It should be appreciated at this time that the code components of curve J are spaced to provide the time interval between the fifth and sixth burst, namely between the $f_6$ burst and the second $f_3$ burst, in order that pulse 128 from the blocking oscillator may be employed to control the actuating system without any possible interference from such code components. In other words, if a code burst occurred in the "gap" between the fifth and sixth components of curve J, the immediately succeeding line-drive pulse would be "gated in" by one of gate circuits 65—68 to effect actuation of actuating system 25 at the same time it is being triggered by pulse 128 from the blocking oscillator. This would, of course, result in very unstable operation since it is possible that the pulse translated by one of gates 65—68 would tend to actuate system 25 to one condition while the pulse from the blocking oscillator would tend to actuate the system to a different condition. Thus, in accordance with the invention and in a manner to be explained more fully hereinafter, the code bursts of curve J are so positioned in point of time with respect to the pulses from blocking oscillator 31 that no conflict results when actuating system 25 is conditioned in accordance with the combination of signal components conjointly derived from the periodically recurring pulses from blocking oscillator 31 and the code components from generator 33.

In response to the sixth signal burst of the sub-combination of curve J, namely the second $f_3$ burst, the last signal pulse of curve X is impressed on control electrode 104 of tube 105 and, as this stage is in its conductive state, the pulse is effective to cut the tube off and change operating conditions. The beam of tube 85 is therefore directed to target element 78 by the operation of multivibrator 26 to include delay line 77 in the video channel; at the same time multivibrator 26 also effects actuation of multivibrator 28, thus effectively switching the beam of tube 100 to remove delay line 95 from the video channel and establish the system in mode "*b*" operation.

Finally, in response to the last signal burst of the subcombination of curve J, that is the $f_5$ burst, the pulse of curve W is impressed on control electrodes 104 and 109 of devices 105 and 110, respectively, to trigger multivibrator 26 to its other condition. The beam of tube 85 is therefore directed to target element 79 to remove delay line 77 from the video channel. The system is consequently established in mode "*a*" as illustrated in the mode-changing diagram of Figure 5, and this is the mode of operation from which the television system starts off upon the resumption of exclusive or sole control of actuating system 25 by the periodically recurring pulses from blocking oscillator 31. Thus, in response to the first pulse of curve B' succeeding the mode-determining interval, actuating system 25 is actuated as previously described to commence its cyclic operation anew.

From a comparison of the mode-changing patterns of Figures 3 and 5, it is apparent that the cyclic operation of the encoding apparatus is interrupted during a field-retrace interval under the control of the code signal components which cooperate with the periodic actuating signal to establish a new initial operating condition at the start of the next field-trace interval when cyclical mode changing is resumed.

In Figure 6, which is a schematic diagram of a preferred form of generator 33, field-drive pulses from synchronizing-signal generator 20 are supplied to a mono-stable multivibrator 228 to produce an elongated pulse of a predetermined duration in response to each applied field-drive pulse. The output terminals of multivibrator 228 are connected to a mono-stable multivibrator 229 which is actuated from its normal operating condition to its abnormal condition in response to the trailing edge of each output pulse from multivibrator 228 to develop a delayed output pulse of a predetermined time duration. The output signal from multivibrator 229 is, in turn, applied as a gating signal to a normally-closed gate circuit 226.

A delay line 225 is connected to synchronizing-signal generator 20 to receive line-drive pulses therefrom, and this delay line has output terminals connected to another input circuit of gate circuit 226 and also to an input circuit of another normally-closed gate circuit 232. The output terminals of gate circuit 226 are connected directly to a generator 247, through a second delay line 227 to another mono-stable multivibrator 231, and over conductors 34 to synchronizing-signal generator 20. The output terminals of multivibrator 231 are connected to another pair of input terminals of gate circuit 232 to supply one gating signal thereto. The output signal of gate circuit 232 is applied to synchronizing-signal generator 20 over conductors 34 and is supplied to a control grid of a beam-deflection device 238 to modulate the electron beam therein, energizing the beam for the duration of the output signal. The output terminals of delay line 227 are also connected to the input terminals of a mono-stable multivibrator 220, the output terminals of which are, in turn, connected to the input circuit of a mono-stable multivibrator 221. The output terminals of multivibrator 221 are connected to another pair of input terminals of gate circuit 232 in order to provide an additional gating or control signal therefor.

Beam-deflection device 238 includes a pair of deflection elements 236, 237 which are connected to the output terminals of a thermal noise generator 235. This generator produces a signal having an instantaneous amplitude that varies in random fashion over a suitable bandwidth and may vary from one operating instant to the next. This thermal noise signal, as applied to deflection electrodes 236, 237, establishes within tube 238 an alternating beam-deflection field having an amplitude at times sufficient to sweep the beam (if it is energized) back and forth across the family of anode segments **240*a*—240*f* and at a rate corresponding to the instantaneous frequency of the output signal of generator 235. Cathode 251 of commutator tube 238 is connected through a resistor 252 to a source of positive bias potential 253**.

The load circuits for the several segmental anodes **240*a*—240*f* are completed through control circuits of a series of additional generators 241—246, respectively. This coupling from the anode elements to the generators permits each generator to be "turned on" or energized by a current pulse resulting from the impingement of the beam in device 238 upon the associated anode segment. Each of the generators 241—247 includes a cycling or timing feature in the manner of a blocking oscillator or other mono-stable generator in order that the output obtained therefrom may have a selected duration exceeding that of the current pulse delivered by its associated anode segment but less than the time separation of successive line-synchronizing pulses. Moreover, each of the generators 241—247** has a distinct, assigned operating frequency as indicated by the indicia $f_1$—$f_7$ to facilitate frequency selection or separation of the outputs from such generators.

The respective areas of the segmental anodes are so chosen that over a relatively long interval of time each receives the same average current as the electron beam scans back and forth under the control of the signal applied to deflection elements 236, 237. More particularly, under the distribution laws an electron beam which is deflected in random fashion under the influence of a noise voltage sweeps over the centrally located target anodes more often than it sweeps over the outermost anodes. Consequently, the areas of the anodes 240a—240f are made progressively greater from the center to the extreme edges of the commutator tube as illustrated in order that the beam is directed to each anode for approximately the same total time over a long time interval. The beam thus dwells on each of the anodes for the same total period of time and, in view of the gating or keying action of unit 232, has an equal probability of impinging on any one of the six for a specified minimum thermal noise deflection voltage corresponding to an R.M.S. value sufficient to sweep the beam from the outermost side of anode 240a to the outermost side of anode 240f. The output terminals of generators 241—247 are connected over conductors 49 to a pair of input terminals of mixer-amplifier 15 and by means of conductors 36 to filter and rectifier units 51—57.

Consideration will now be given to the operation of generator 33 as illustrated in Figure 6 to describe the manner in which the code components of curve J (Figure 4) may be produced, with particular reference to the waveforms of Figure 7. Periodically recurring line-drive pulses, shown in curve A (reproduced in Figure 7 for convenience), are supplied from generator 20 to delay line 225 to develop the delayed pulses of curve BB. This delay line is terminated in its characteristic impedance and exhibits a delay exceeding the duration of the line-drive pulses but substantially less than the time separation of such pulses. Simultaneously with the application of line-drive pulses to delay line 225, periodically recurring field-drive pulses, shown in curve CC, are applied to multivibrator 228. The leading edge of an applied field-drive pulse actuates the multivibrator from its normal operating condition to an abnormal operating condition and the multivibrator automatically returns to its normal condition after a selected time interval determined by the internal cycling circuits to produce the pulse of curve DD. The parameters of the multivibrator are so chosen that the trailing edge of this pulse occurs during the field-retrace time of the system, at a point following the equalizing pulses which succeed the serrated field pulse in present-day practice. This output signal is applied to mono-stable multivibrator 229 which responds to the trailing edge thereof and produces a gating pulse, shown in curve EE. The parameters of multivibrator 229 are so chosen that this pulse overlaps, in point of time, one of the delayed line-drive pulses from delay line 225. Gate circuit 226 receives the gating pulse as well as delayed line-drive pulses from delay line 225 and responds to their coincident effect to translate a pulse (curve FF) to generator 247. This generator is energized by the applied pulse and develops a signal burst of frequency $f_7$ having a time duration exceeding the duration of the actuating pulse but less than the time separation of successive line-synchronizing pulses. This signal burst of frequency $f_7$ produced at the output terminals of unit 247 is utilized for resetting blocking oscillator 31 as described hereinbefore.

The output signal from gate circuit 226 (curve FF) is also delayed in delay line 227 which is terminated in its characteristic impedance and which exhibits such a delay that its output pulse, shown in curve GG, follows the trailing edge of the pulse of curve FF. The delayed output pulse is applied to mono-stable multivibrator 231, producing a gating pulse, shown in curve HH, for gate circuit 232. The parameters of multivibrator 231 are so chosen that its output pulse (curve HH) overlaps, in point of time, the number of delayed line-drive pulses (curve BB) to be employed in coding—six for the case in question. The pulse of curve GG from delay line 227 is also applied to multivibrator 220 which is actuated in response to that pulse from its normal operating condition to an abnormal operating condition. Multivibrator 220 automatically returns to its normal condition after a selected time interval determined by its internal cycling circuits to produce the pulse of curve KK. The parameters of multivibrator 220 are so chosen that this pulse embraces the next four succeeding delayed line-drive pulses from delay line 225. The pulse of curve KK is applied to mono-stable multivibrator 221 which responds to the trailing edge thereof and produces a negative gating pulse, shown in curve LL. This pulse is supplied to gate circuit 232 in order to render that circuit ineffective to translate line-drive pulses during its duration. With this arrangement, the code bursts are effectively grouped or distributed in such a manner that a "gap" is established between the fifth and sixth burst.

Delayed line-drive pulses are continuously supplied from delay line 225 to gate circuit 232 and those which occur within the duration of the gating pulse shown in curve HH, with the exception of that occurring in time coincidence with the negative gating pulse of curve LL, are translated to beam-deflection device 238. The translated pulses, shown in curve MM, intensity modulate the beam of tube 238 which is normally biased beyond cutoff by virtue of positive potential 253, turning the beam on for the duration of each such pulse. At the same time, the variable-amplitude sweep signal impressed on deflection elements 236, 237 by noise generator 235 creates a deflection field varying at a random rate to scan the beam back and forth across segmental anodes 240a—240f. If the electron-beam happens to be impinging on an anode segment at the instant a pulse of curve MM is applied to the control electrode, a pulse of current flows in the circuit of that segmental anode to "turn on" the one of generators 241—246 that is coupled thereto. It should be appreciated that suitable circuitry may be included in the code generator to insure that no more than one of generators 241—246 is "turned on" in response to any given gating pulse of curve MM. This may be achieved, for example, by constructing noise generator 235 in such a manner that the rate of output voltage change is controlled in order that the scanning velocity of the beam of tube 238 is never high enough to scan more than one anode 240a—240f during the time interval of a gating pulse. Alternatively, interlocking circuits may be provided between generators 241—246 so that each time any one of them is triggered into operation, the remaining generators are disabled for a period at least equal to the gating pulse interval.

In the present illustration it may be assumed that at the time the first pulse of curve MM occurs the beam is incident on anode 240d and thus generator 244 produces a burst of signal of frequency $f_4$. It may be further assumed that as the succeeding pulses of curve MM occur, generators 241, 243, 246, 243 and 245 are "turned on" in the recited order, producing corresponding bursts of signal of frequencies $f_1$, $f_3$, $f_6$, $f_3$ and $f_5$, as shown in curve J. A group, or what has been called a sub-combination, of code-signal components of various frequencies is thus established, the components appearing in fortuitous or random sequence within each mode-determining interval under the control of noise generator 235.

In order that a subscriber receiver may utilize the coded transmission, it is necessary that the sub-combination of code signal components of curve J be made known to such subscriber receivers. To that end, the code bursts are applied to mixer-amplifier 15 via conductors 49 to be combined with the composite video signal for transmission to subscriber receivers. The signal bursts of various frequencies occur between the line-drive pulses superimposed on the vertical or field retrace blanking pulses, and in order not to disturb the sweep systems of the subscriber receivers it is desirable that the amplitude level of the blanking pulse be modified to effect an inward modulation by the code signal components. To that end, the pulses shown in curves FF and MM are supplied to synchronizing-signal generator 20 over conductors 34 to produce suitable modulating pulses which, in turn, are supplied to mixer-amplifier 15 over conductors 30 to downward modulate the vertical blanking pulse at the appropriate times. Inasmuch as the time duration of each modulating pulse should equal the duration of the individual signal bursts (curve J) and therefore exceed the duration of the individual actuating pulses shown in curves FF and MM, synchronizing-signal generator 20 may include a timing device, such as a mono-stable multivibrator, to develop such modulating pulses of selected time duration in response to the actuating pulses.

It is, of course, evident that the utilization of the video carrier to convey the encoding information is immaterial to the inventive concept and that such information may be distributed in whole or in part in other manners, as for example, in the form of auxiliary modulation of the sound carrier or of a separate carrier, or by means of a line circuit extending from the transmitter to subscriber receivers. Moreover, it is contemplated that such coding information may even be developed locally as for example by means of a code card provided with suitable perforations.

It should be mentioned at this time that in the particular illustration the code signal components are produced during a portion of the vertical-retrace interval so that actuation of actuating system 25 under the conjoint control of the code components and the periodically recurring components is effected between field-trace intervals. However, it should be understood that the code signal components may be developed and utilized in conjunction with periodically recurring components at times other than field-retrace intervals, particularly in the event that the coding information is distributed to authorized receivers in one of the alternative manners mentioned above.

The receiver of Figure 8, which may utilize the subscription telecast from the transmitter of Figure 1, includes a radio-frequency amplifier 130 having input terminals connected to an antenna 131, 132 and output terminals connected to a first detector 133. The first detector is connected through an intermediate-frequency amplifier 134 to a second detector 135 which, in turn, is connected to a video amplifier 136. The video amplifier is coupled through an encoding apparatus or decoder 140 to the input electrodes 139 of a cathode-ray image-reproducing device 141. Decoder 140 may be constructed in a similar manner to coder 12 at the transmitter (Figures 1 and 2) with the exception that it is controlled to operate in a complementary fashion in order effectively to compensate for the variations in the timing of the received television signal. More particularly, when coder 12 imparts a delay of $\Delta t$ to the video components, decoder 140 translates the video signal to the image reproducer with no appreciable time delay. Similarly, when coding apparatus 12 is in the "zero delay" condition, decoder 140 is in the "$\Delta t$ delay" condition; when coder 12 is in the "$\frac{1}{3}\Delta t$ delay" condition, decoder 140 is in the "$\frac{2}{3}\Delta t$ delay" condition; and finally, when unit 12 is in the "$\frac{2}{3}\Delta t$ delay" condition, decoding device 140 is in the "$\frac{1}{3}\Delta t$ delay" condition. Thus, for example, decoder 140 may be of precisely the same construction as coder 12 (Figure 2) except that the circuit connections of either the target electrodes or the deflectors of each beam tubes are reversed or interchanged.

Second detector 135 is also coupled through a synchronizing-signal separator 142 to a field-sweep system 143 and to a line-sweep system 144. The output terminals of sweep systems 143 and 144 are connected respectively to field-deflection elements 145 and line-deflection elements 146 associated with reproducing device 141. Line-drive pulses are derived from sweep system 144 and supplied to a conventional 5:1 blocking oscillator 154 which, in turn, is connected to an Eccles-Jordan multivibrator 149 which constitutes one portion of an actuating system 148. Multivibrator 149 is connected to a buffer amplifier 150 which, in turn, is connected to a second Eccles-Jordan multivibrator 151, amplifier 150 and multivibrator 151 constituting the remaining portion of actuating system 148. Multivibrator 149 has output terminals connected to a first switch tube circuit 137 constituting one portion of decoder 140, and multivibrator 151 has output terminals connected to a second switch tube circuit 138 constituting the other portion of the decoder.

In order to facilitate the separation of the code signal components from the composite television signal, it is desirable to provide circuitry for selecting or "gating in" only that portion of the composite video signal containing such components. To that end, field-drive pulses are derived from synchronizing-signal separator 142 and supplied to a mono-stable multivibrator 160 having output terminals connected to a normally-closed gated amplifier 159. The output terminals of video amplifier 136 are also connected over conductors 191 to gated amplifier 159 to supply the composite video signal thereto, and the output circuit of this amplifier is connected to the input circuits of each one of a series of filter and rectifier units 171—177, the output circuit of unit 177 being connected through a normally-closed gate circuit 156 to another pair of input terminals of 5:1 blocking oscillator 154. Gate circuit 156 has another pair of input terminals connected to line-sweep system 144 in order to derive line-drive pulses therefrom. The output circuits of filter and rectifier units 171—176 are connected to the input terminals of a transposition mechanism 164 which is preferably similar to mechanism 60 at the transmitter. Accurate decoding of the received signal is effected only if the various interconnections established by mechanism 164 are identical to the interconnections established by the transposer at the transmitter. The mechanism switch setting information is disseminated only to authorized subscribers and a suitable charge may, of course, be assessed for such information.

Transportation mechanism 164 has four output conductors 178—181 connected respectively to input terminals of a series of normally-open gate circuits 182—185. Line-drive pulses from sweep system 144 are also supplied to each one of the gate circuits, and the output circuits of gates 182 and 183 are connected respectively over conductors 186 and 187 to input terminals of multivibrator 149, while the output circuits of gates 184 and 185 are connected respectively over conductors 188 and 189 to input terminals of multvibrator 151.

The described circuitry included in the receiver, aside from that conventionally required for normal television reception, may be exactly the same as that discussed in greater detail in connection with the transmitter, except for the reversal of connections to the deflectors or target electrodes of each beam tube of decoder 140 as described above. Blocking oscillator 154, actuating system 148, gate circuit 156, filter and rectifier units 171—177, transposer 164 and gate circuits 182—185 are identical in construction and perform the same functions as corresponding elements 31, 25, 38, 51—57, 60 and 65—68 in the transmitter of Figure 1.

In the operation of the receiver of Figure 8, the coded television signal from the transmitter of Figure 1 is intercepted by antenna 131, 132, amplified by radio-frequency amplifier 130 and heterodyned to the selected intermediate frequency of the receiver in first detector 133. The resulting intermediate-frequency signal is amplified in intermediate-frequency amplifier 134 and detected in second detector 135 to produce a composite video signal. This later signal is amplified in video amplifier 136 and translated through decoder 140 to the input terminals 139 of image-reproducing device 141 to control the intensity of the cathode-ray beam of the device in well-known manner.

The synchronizing components are separated in separator 142, the field-synchronizing components being utilized to synchronize sweep system 143 and, hence, the field scansion of image reproducer 141, whereas the line-synchronizing components are utilized to synchronize sweep system 144 and, therefore, the line scansion of device 141. Of course, the sound-modulated carrier received along with the video carrier is translated in the usual way through an audio system which has been omitted from the drawings for purposes of simplicity.

Decoding at the receiver is accomplished in the identical manner as explained hereinbefore in connection with the coding operation at the transmitter; accordingly, the waveforms of Figures 3–5 are illustrative of receiver as well as transmitter operation, and corresponding letter designations are assigned to the receiver diagram of Figure 8 where appropriate. Briefly, blocking oscillator 154 supplies periodically recurring pulses to actuating system 148 which functions in a cyclic manner to produce a periodically recurring mode-changing or rather mode-change-compensating pattern. Mono-stable multivibrator 160 which is actuated from its normal to abnormal operating condition by field-drive pulses returns to its normal condition after a predetermined time interval in order to produce a gating pulse which overlaps, in point of time, the occurrence of the code signal components. The composite video signal is meanwhile continuously applied to normally-closed gated amplifier 159, but by virtue of the gating pulse produced by mono-stable multivibrator 160, only the code signal bursts are translated therethrough to filter and rectifier units 171—177. The first code burst of the subcombination is accepted and rectified by unit 177 and is utilized to "gate in" the succeeding line-drive pulse for resetting blocking oscillator 154. The remaining bursts of the subcombination are segregated from one another in units 171—176 for selective application through transposer 164 to conductors 178—181. The rectified bursts of curves R, S, T, and V are respectively applied to gate circuits 182—185 and "gate in" the signals of curves W and X to multivibrator 149 and the signals of curves Y and Z to multivibrator 151. If the setting of transposition mechanism 164 corresponds to that employed at the corresponding mechanism 60 at the transmitter, actuating system 148 operates exactly as previously described for the corresponding transmitter actuating system 25. As previously explained, decoder 140 functions in precisely the same manner as coder 12 at the transmitter, except in a complementary fashion, to effect intelligible image reproduction.

The receiver of Figure 8 has one feature which has no counterpart in the transmitter of Figure 1. Specifically, a mixer 161 is connected via conductors 163 to the output terminals of mono-stable multivibrator 160 to derive the gating pulse which embraces the code signal components, and is further connected to a blanking circuit 162 which receives line-drive pulses from sweep system 144. Mixer 161 has its output terminals connected via conductors 190 to the input electrodes 139 of image reproducer 141 and the purpose of this mixer is to supply a blanking signal during field-retrace as well as line-retrace intervals to thereby insure complete blanking of the picture tube during such intervals. This feature is desirable inasmuch as the code signal components developed during field-retrace may cause the composite television signal to fall below "black level" during such intervals and thereby illuminate the retrace. Additionally, blanking is desirable during line-retrace inasmuch as the switching action of decoder 140 is accomplished during selected line-retrace intervals and transient pulses developed at that time might otherwise energize the electron beam of reproducer 141.

This invention provides, therefore, an encoding arrangement for a subscription television system which is conditioned in accordance with a combination of signal components conjointly determined by two different signal sources. One source develops a series of periodically recurring signal components while the other source develops code signal components individually occuring at time intervals other than the occurrence of the periodically recurring components.

While particular embodiments of the invention have been shown and described, modifications may be made, and it is intended in the appended claims to cover all such modifications as may fall within the true spirit and scope of the invention.

We claim:

1. An encoding arrangement for a subscription television system comprising: encoding apparatus having a plurality of operating conditions individually establishing a predetermined operating mode in said television system; an actuating system coupled to said encoding apparatus and having a corresponding plurality of operating conditions each of which is effective to establish an assigned one of the aforesaid operating conditions of said encoding apparatus, said actuating system being responsive to a combination of applied signal components for assuming a selected one of its aforesaid operating conditions determined by the code pattern represented by said combination of signal components; a source of synchronizing components; a first signal source coupled to said source of synchronizing components for developing a first series of periodically recurring signal components; means including a second signal source for developing code signal components individually occurring only at time intervals other than those in which the components of said first series occur and collectively representing a subcombination in accordance with a predetermined schedule; and means coupling said first and second sources to said actuating system for effectively applying thereto actuating pulses corresponding to said code and periodically recurring components to condition said system in accordance with the combination of signal components conjointly determined by said first and second sources.

2. An encoding arrangement for a subscription television system comprising: encoding apparatus having a plurality of operating conditions individually establishing a predetermined operating mode in said television system; an actuating system coupled to said encoding apparatus and having a corresponding plurality of operating conditions each of which is effective to establish an assigned one of the aforesaid operating conditions of said encoding apparatus, said actuating system being responsive to a combination of applied signal components for effecting actuation of said encoding apparatus between its aforesaid operating conditions in accordance with a code schedule determined by the code pattern represented by said combination of signal components; a first signal source for developing a first series of periodically recurring signal components; means including a second signal source for developing code signal components individually occurring only at time intervals other than those in which the components of said first series occur and collectively representing a sub-combination in accordance with a predetermined schedule; and means coupling said first and second sources to said actuating system for effectively applying thereto actuating pulses corresponding to said code and periodically recurring components to effect actuation of said system in accordance with the combination of signal components conjointly determined by said first and second sources.

3. An encoding arrangement for a subscription television system comprising: encoding apparatus having a plurality of operating conditions individually establishing a predetermined operating mode in said television system; an actuating system coupled to said encoding apparatus and having a corresponding plurality of operating conditions each of which is effective to establish an assigned one of the aforesaid operating conditions of said encoding apparatus, said actuating system being responsive during each one of a plurality of mode-determining intervals to a combination of applied signal components for assuming a selected one of its aforesaid operating conditions determined by the code pattern represented by said combination of signal components; a first signal source for developing a first series of periodically recurring signal components; means including a second signal source for developing during each of said mode-determining intervals code signal components individually occurring only at time intervals other than those in which the components of said first series occur and collectively representing a sub-combination which may vary from one mode-determining interval to the next in accordance with a predetermined schedule; and means coupling said first and second sources to said actuating system for effectively applying thereto actuating pulses corresponding to said code and periodically recurring components to condition said system in each mode-determining interval in accordance with the combination of signal components conjointly determined by said first and second sources.

4. In a subscription television system for translating a television signal including video signal components in recurring line-trace intervals and line-synchronizing components in intervening line-retrace intervals; encoding apparatus having a plurality of operating conditions individually establishing a predetermined operating mode in said television system; an actuating system coupled to said encoding apparatus and having a corresponding plurality of operating conditions each of which is effective to establish an assigned one of the aforesaid operating conditions of said encoding apparatus, said actuating system being responsive during each one of a plurality of mode-determining intervals to a combination of applied signal components for assuming a selected one of its aforesaid operating conditions determined by the code pattern represented by said combination of signal components; a first signal source for developing a first series of periodically recurring signal components representing spaced ones of said line-trace intervals; means including a second signal source for developing during each of said mode-determining intervals code signal components individually occurring only at time intervals other than those in which the components of said first series occur and collectively representing a sub-combination which may vary from one mode-determining interval to the next in accordance with a predetermined schedule; and means coupling said first and second sources to said actuating system for effectively applying thereto actuating pulses corresponding to said code and periodically recurring components to condition said system in each mode-determining interval in accordance with the combination of signal components conjointly determined by said first and second sources.

5. An encoding arrangement for a subscription television system comprising: encoding apparatus having a plurality of operating conditions individually establishing a different operating mode in said system; an actuating system coupled to said encoding apparatus and having a corresponding plurality of operating conditions each of which is effective to establish an assigned one of the aforesaid operating conditions of said encoding apparatus, said actuating system being responsive to an applied signal for effecting actuation of said encoding apparatus between its aforesaid operating conditions; means for developing a series of periodically recurring signal components and for applying said periodically recurring components to said actuating system to effect actuation of said encoding apparatus in a predetermined periodic repeating sequence; means for developing during each of a series of spaced mode-determining intervals code signal components individually occurring only at time intervals other than those in which said periodically recurring components occur and collectively representing a sub-combination which may vary from one mode-determining interval to the next in accordance with a predetermined schedule; and means coupling said last-mentioned means to said actuating system for effectively applying thereto actuating pulses corresponding to said code and periodically recurring components to interrupt said periodic sequence to condition said system in each mode-determining interval in accordance with the combination of signal components conjointly determined by said periodically recurring components and said code signal components.

6. In a subscription television system for translating a television signal including video-signal components in recurring trace intervals and synchronizing-signal components in intervening retrace intervals: encoding apparatus having a plurality of operating conditions individually establishing a different operating mode in said system; an actuating system coupled to said encoding apparatus and having a corresponding plurality of operating conditions each of which is effective to establish an assigned one of the aforesaid operating conditions of said encoding apparatus, said actuating system being responsive to an applied signal for effecting actuation of said encoding apparatus between its aforesaid operating condition; means for developing a series of periodically recurring signal components and for applying said periodically recurring components to said actuating system to effect actuation of said encoding apparatus in a predetermined periodic repeating sequence; means for developing during at least some of said retrace intervals code signal components individually occurring only at time intervals other than those in which said periodically recurring components occur and collectively representing a sub-combination which may vary from one of said last-mentioned retrace intervals to the next in accordance with a predetermined schedule; and means coupling said last-mentioned means to said actuating system for effectively applying thereto actuating pulses corresponding to said code and periodically recurring components to interrupt said periodic sequence to condition said system in each of said last-mentioned retrace-intervals in accordance with the combination of signal components conjointly determined by said periodically recurring components and said code signal components.

7. In a subscription television system for translating a television signal including video-signal components in recurring field-trace intervals and synchronizing-signal components in intervening field-retrace intervals: encoding apparatus having a plurality of operating conditions individually establishing a different operating mode in said system; an actuating system coupled to said encoding apparatus and having a corresponding plurality of operating conditions each of which is effective to establish an assigned one of the aforesaid operating conditions of said encoding apparatus, said actuating system being responsive to an applied signal for effecting actuation of said encoding apparatus between its aforesaid operating conditions; means for developing a series of periodically recurring signal components and for applying said periodically recurring components to said actuating system to effect actuation of said encoding apparatus in a predetermined periodic repeating sequence; means for developing during certain ones of said field-retrace intervals code signal components each occurring only at time intervals other than those in which said periodically recurring components occur, said code signal components individually having a predetermined identifying characteristic and collectively representing a sub-combination which may vary from one of said last-mentioned field-retrace intervals to the next in accordance with a predetermined schedule; means responsive to said identifying characteristics for separating said code signal components from one another; and means coupling said last-mentioned means to said actuating system and responsive to the separated code signal components for effectively applying thereto actuating pulses corresponding to said code and periodically recurring components to interrupt said periodic sequence to condition said system during each of said last-mentioned field-retrace intervals in accordance with the combination of signal components conjointly determined by said periodically recurring components and said code signal components.

8. In a subscription television system for translating a television signal having a series of field-trace intervals recurring at a predetermined field-scanning frequency: encoding apparatus having a plurality of operating conditions individually establishing a different operating mode in said system; an actuating system coupled to said encoding apparatus and having a corresponding plurality of operating conditions each of which is effective to establish an assigned one of the aforesaid operating conditions of said encoding apparatus, said actuating system being responsive to an applied signal for effecting actuation of said encoding apparatus between its aforesaid operating conditions; means for developing a series of signal components recurring periodically at a frequency greater than said field-scanning frequency and for applying said periodically recurring components to said actuating system to effect actuation of said encoding apparatus in a predetermined periodically repeating sequence and at a rate faster than said field-scanning frequency; means for developing during each of a series of spaced mode-determining intervals code signal components individually occurring only at time intervals other than those in which said periodically recurring components occur and collectively representing a sub-combination which may vary from one mode-determining interval to the next in accordance with a predetermined schedule; and means coupling said last-mentioned means to said actuating system for effectively applying thereto actuating pulses corresponding to said code and periodically recurring components to interrupt said periodic sequence to condition said system in each mode-determining interval in accordance with the combination of signal components conjointly determined by said periodically recurring components and said code signal components.

9. In a subscription television system for translating a television signal including video-signal components in recurring field-trace intervals and synchronizing-signal components in intervening field-retrace intervals: encoding apparatus having a plurality of operating conditions individually establishing a different operating mode in said system; an actuating system coupled to said encoding apparatus and having a corresponding plurality of operating conditions each of which is effective to establish an assigned one of the aforesaid operating conditions of said encoding apparatus, said actuating system being responsive to an applied signal for effecting actuation of said encoding apparatus between its aforesaid operating conditions; a source of line-synchronizing components; a frequency divider coupled to said source for developing a series of periodically recurring signal components and for applying said periodically recurring components to said actuating system to effect actuation of said encoding apparatus in a predetermined periodically repeating sequence; means for developing during certain ones of said field-retrace intervals code signal components each occurring only at time intervals other than those in which said periodically recurring components occur, said code signal components individually having a predetermined identifying characteristic and collectively representing a subcombination which may vary from one of said last-mentioned field-retrace intervals to the next in accordance with a predetermined schedule; means responsive to said identifying characteristics for separating said code signal components from one another; and means coupling said last-mentioned means to said actuating system and responsive to the separated code signal components for effectively applying thereto actuating pulses corresponding to said code and periodically recurring components to interrupt said periodic sequence to condition said system during each of said last-mentioned field-retrace intervals in accordance with the combination of signal components conjointly determined by said periodically recurring components and said code signal components.

10. A coding arrangement for a subscription television transmitter comprising: code generating apparatus for developing a series of code signal components individually having a predetermined identifying characteristic; a source of synchronizing components; a frequency divider coupled to said source for developing a series of periodically recurring signal components; and means coupled to said code generating apparatus for controlling the operation thereof so that said code signal components each occur only at time intervals other than those in which said periodically recurring components occur.

11. A coding arrangement for a subscription televison transmitter comprising: coding apparatus having a plurality of operating conditions individually establishing a predetermined operating mode in said television transmitter; an actuating system coupled to said coding apparatus and having a corresponding plurality of operating conditions each of which is effective to establish an assigned one of the aforesaid operating conditions of said coding apparatus, said actuating system being responsive to a combination of applied signal components for assuming a selected one of its aforesaid operating conditions determined by the code pattern represented by said combination of signal components; a source of synchronizing components; a first signal source coupled to said source of synchronizing components for developing a first series of periodically recurring signal components; means including a second signal source for developing code signal components individually occurring only at time intervals other than those in which said components of said first series occur and collectively representing a subcombination in accordance with a predetermined schedule; and means coupling said first and second sources to said actuating system for effectively applying thereto actuating pulses corresponding to said code and periodically recurring components to condition said system in accordance with the combination of signal components conjointly determined by said first and second sources.

12. In a subscription television transmitter for transmitting a television signal including video-signal components in recurring field-trace intervals and synchronizing signal components in intervening field-retrace intervals; coding apparatus having a plurality of operating conditions individually establishing a different operating mode in said transmitter; an actuating system coupled to said coding apparatus and having a corresponding plurality of operating conditions each of which is effective to establish an assigned one of the aforesaid operating conditions of said coding apparatus, said actuating system being responsive to an applied signal for effecting actuation of said coding apparatus between its aforesaid operating conditions; means for developing a series of periodically recurring signal components and for applying said periodically recurring components to said actuating system to effect actuation of said coding apparatus in a predetermined repeating sequence; means for developing during certain ones of said field-retrace intervals code signal components each occurring only at time intervals other than those in which said periodically recurring components occur, said code signal components individually having a predetermined identifying characteristic and collectively representing a subcombination which may vary from one of said last-mentioned field-retrace intervals to the next in accordance with a predetermined schedule; means responsive to said identifying characteristics for separating said code signal components from one another; and means coupling said last-mentioned means to said actuating system and responsive to the separated code signal components for effectively applying thereto actuating pulses corresponding to said code and periodically recurring components to interrupt said periodic sequence to condition said system during each of said last-mentioned field-retrace intervals in accordance with the combination of signal components conjointly determined by said periodically recurring components and said code signal components.

13. A decoding arrangement for a subscription television receiver comprising: decoding apparatus having a plurality of operating conditions individually establishing a predetermined operating mode in said television receiver; an actuating system coupled to said decoding apparatus and having a corresponding plurality of operating conditions each of which is effective to establish an assigned one of the aforesaid operating conditions of said decoding apparatus, said actuating system being responsive to a combination of applied signal components for assuming a selected one of its aforesaid operating conditions determined by the code pattern represented by said combination of signal components; a source of synchronizing components; a first signal source coupled to said source of synchronizing components for developing a first series of periodically recurring signal components; means including a second signal source for developing code signal components individually occurring only at time intervals other than those in which said components of said first series occur and collectively representing a subcombination in accordance with a predetermined schedule; and means coupling said first and second sources to said actuating system for effectively applying thereto actuating pulses corresponding to said code and periodically recurring components to condition said system in accordance with the combination of signal components conjointly determined by said first and second sources.

14. In a subscription television receiver for utilizing a television signal including video-signal components in recurring field-trace intervals and synchronizing signal components in intervening field-retrace intervals, and coded in accordance with a coding schedule: decoding apparatus having a plurality of operating conditions individually establishing a different operating mode in said receiver; an actuating system coupled to said decoding apparatus and having a corresponding plurality of operating conditions each of which is effective to establish an assigned one of the aforesaid operating conditions of said decoding apparatus, said actuating system being responsive to an applied signal for effecting actuation of said decoding apparatus between its aforesaid operating conditions; means for developing a series of periodically recurring signal components and for applying said periodically recurring components to said actuating system to effect actuation of said decoding apparatus in a predetermined repeating sequence; means for developing during certain ones of said field retrace intervals code signal components each occurring only at time intervals other than those in which said periodically recurring components occur, said code signal components individually having a predetermined identifying characteristic and collectively representing a subcombination which may vary from one of said last-mentioned field-retrace intervals to the next in accordance with said coding schedule; means responsive to said identifying characteristics for separating said code signal components from one another; and means coupling said last mentioned means to said actuating system and responsive to the separated code signal components for effectively applying thereto actuating pulses corresponding to said code and periodically recurring components to interrupt said periodic sequence to condition said system during each of said last-mentioned field-retrace intervals in accordance with the combination of signal components conjointly determined by said periodically recurring components and said code signal components.

References Cited in the file of this patent

UNITED STATES PATENTS

| | | |
|---|---|---|
| 2,472,774 | Mayle | June 7, 1949 |
| 2,656,410 | Herrick et al. | Oct. 20, 1953 |
| 2,697,741 | Roschke | Dec. 21, 1954 |